United States Patent
Patel et al.

(10) Patent No.: US 10,271,321 B1
(45) Date of Patent: Apr. 23, 2019

(54) METHOD AND APPARATUS FOR BLIND DECODING

(71) Applicant: MBIT WIRELESS, INC., Irvine, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 291 days.

(21) Appl. No.: 15/185,667

(22) Filed: Jun. 17, 2016

(51) Int. Cl.
| | | |
|---|---|---|
| *H04L 1/00* | (2006.01) | |
| *H04L 5/00* | (2006.01) | |
| *H04W 52/02* | (2009.01) | |
| *H04W 72/04* | (2009.01) | |
| *H04W 72/08* | (2009.01) | |
| *H04W 72/12* | (2009.01) | |

(52) U.S. Cl.
CPC ......... *H04W 72/042* (2013.01); *H04L 1/0047* (2013.01); *H04L 5/0048* (2013.01); *H04W 52/0216* (2013.01); *H04W 72/085* (2013.01); *H04W 72/1226* (2013.01)

(58) Field of Classification Search
None
See application file for complete search history.

(56) References Cited

U.S. PATENT DOCUMENTS

| | | | | |
|---|---|---|---|---|
| 2015/0092691 A1* | 4/2015 | Hwang | ................. | H04L 5/0048 370/329 |
| 2016/0254878 A1* | 9/2016 | Wang | .................... | H04L 5/0053 370/329 |
| 2017/0142665 A1* | 5/2017 | Tabet | ................... | H04W 52/241 |
| 2017/0223687 A1* | 8/2017 | Kuchibhotla | ....... | H04W 72/044 |
| 2018/0083733 A1* | 3/2018 | Chen | ..................... | H04L 1/0048 |

\* cited by examiner

*Primary Examiner* — Chirag G Shah
*Assistant Examiner* — Srinivasa R Reddivalam
(74) *Attorney, Agent, or Firm* — Lerner, David, Littenberg, Krumholz & Mentlik, LLP

(57) ABSTRACT

The 3GPP LTE wireless communication system employs dynamic scheduling and assignment of resources using the Physical Downlink Control Channel (PDCCH) to support low latency requirements for many applications. To keep the payload overhead low on the control messages, the dynamic scheduling and assignment messages over the PDCCH need to be decoded by the User Equipment (UE) by searching a number of possible PDCCH candidates in a given control region of the 3GPP LTE wireless communication system. This is often referred to as blind decoding of PDCCH. The high number of blind decoding attempts may lead to increased power consumption in a UE. A method and apparatus are disclosed that enable a UE to reduce the total number of decoding attempts without missing any PDCCH candidates that may be addressed to the UE which in turn may reduce the power consumption and may reduce the probability of false DCI detection.

19 Claims, 21 Drawing Sheets

FIG. 11

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Common Search Space CCEs | CCE | CCE | CCE | CCE | CCE | CCE | CCE | CCE | CCE | CCE | CCE | CCE | CCE | CCE | CCE | CCE |

| AL-4 PDCCH Candidates | PDCCH #0 | PDCCH #1 | PDCCH #2 | PDCCH #3 |
|---|---|---|---|---|

| AL-8 PDCCH Candidates | PDCCH #0 | PDCCH #1 |
|---|---|---|

METHOD AND APPARATUS FOR BLIND DECODING

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many wireless communication systems, normally the communication between the base station and client terminals is organized into frames as shown in FIG. 3. The frame duration may be different for different communication systems and normally it may be in the order of milliseconds. For a given communication system the frame duration may be fixed. For example, the frame duration may be 10 milliseconds.

In a TDD wireless communication system, a frame may be divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel.

Orthogonal Frequency Division Multiplexing (OFDM) systems typically use Cyclic Prefix (CP) to combat intersymbol interference and to maintain the subcarriers orthogonal to each other under a multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred herein as OFDM signal.

The $3^{rd}$ Generation Partnership Project (3GPP) Long Term Evolution (LTE) wireless communication system air interface is organized into subframes of one millisecond (ms) which consists of 12 or 14 OFDM symbols depending on the specific system parameters. As shown in FIG. 5, ten subframes make up one radio frame. First few OFDM symbols of a subframe are used for control channels to manage the allocation of resources in uplink and downlink as shown in FIG. 5. The first few OFDM symbols used for the control channels is referred to as the control region herein. The number of subcarriers in each OFDM symbol varies depending on the specific system parameters. One subcarrier in one OFDM symbol is referred as Resource Element (RE) as shown in FIG. 6. For example, a 3GPP LTE wireless communication system with a 10 MHz channel bandwidth and normal Cyclic Prefix (CP) will have 600 REs and 14 OFDM symbols in one subframe. A single RE may be used to communicate one point from a modulation constellation such as Quadrature Phase Shift Keying (QPSK). In 3GPP LTE wireless communication system, it may be possible to use other modulation constellations for the data region of a subframe, but for the control region only QPSK modulation may be used. Two bits of information may be mapped to a QPSK modulation symbol. Therefore, a single RE can be used to map two bits of information.

A base station in a 3GPP LTE wireless communication system may be referred to as an evolved Node B (eNB). A client terminal in a 3GPP LTE wireless communication system may be referred to as User Equipment (UE). Reference Symbols (RS) are transmitted by an eNB to help a UE to perform channel estimation which may be required for coherent demodulation of the control channels and payload data. The RS are specific REs in a subframe for which the UE knows, a priori, the information bits used for modulating those specific REs. Using the a priori information about the information bits in RS REs, the UE may be able to perform channel estimation to demodulate other REs used for control channel and payload data transmission. One specific arrangement of RS REs is shown in FIG. 7 for the case of a single transmit antenna port at the eNB.

The Physical Downlink Control Channel (PDCCH) is a control channel used by an eNB in 3GPP LTE wireless communication system for the purpose of allocating resources to one or more UEs that may be present in its coverage area. To keep the overhead low for the control messages used for allocating resources, a UE may be need to search a specific portion of the control region of the 3GPP LTE wireless communication system air interface as shown in FIG. 5. The PDCCH is specified in units of Control Channel Elements (CCEs) and the CCEs in turn are specified in units of Resource Element Groups (REGs). Specifically, one REG consists of four REs as shown in FIG. 8 and one CCE consists of nine REGs as shown in FIG. 9. A PDCCH may consist of one, two, four, or eight CCEs a shown in FIG. 10. The number of CCEs used for a PDCCH is referred herein as Aggregation Level (AL), i.e., AL-1, AL-2, AL-4, and AL-8 for one, two, four and eight CCEs. There may be multiple PDCCHs transmitted by an eNB in the control region of a subframe to allocate resources to multiple UEs in a single subframe.

In order to limit the number of PDCCHs the UE may need to attempt to decode to find the specific PDCCH that may contain resource allocation for it, the control region for the PDCCH is organized into Search Spaces. Two types of search spaces are used: Common Search Space ("CSS") and UE Specific Search Space ("UESSS"). The CSS is a subset of first 16 CCEs from all the available CCEs in the control region of a subframe and the CSS is the same for all UEs served by a given eNB. The UESSS is also a subset of CCEs from all the available CCEs in the control region of a subframe. However, the subset of CCEs used for UESSS is specific to each UE and it may vary from one subframe to the next. The subset of CCEs used in CSS and the subset of CCEs used in UESSS may be disjoint, partially overlapping, or entirely overlapping.

In the CSS, the UE needs to consider only AL-4 and AL-8. There are four different AL-4 candidates and two different AL-8 candidates in CSS. This leads to a total of six PDCCH candidates from AL perspective as illustrated in FIG. 11. In the UESSS, the UE needs to consider all four AL. In a manner similar to CSS, there are six different AL-1 candidates, six different AL-2 candidates, two different AL-4 candidates and two different AL-8 candidates. This leads to a total of 16 UESSS PDCCH candidates as illustrated in FIG. 12.

The payload data describing the resource allocation information that is transmitted using PDCCH is referred to as Downlink Control information (DCI). There are different types of resource allocation for downlink and uplink. The length of the allocation information varies based on the system parameters being used. Therefore, the length of the DCI may vary. The DCI payload in PDCCH is protected by error correction coding (convolutional codes) as well as error detection based on a 16-bit CRC. A given PDCCH candidate may be used to send a DCI of one of two possible different lengths. Since the length of the DCI payload may be different, the FEC encoding and decoding is also different even though the total number of coded bits may be the same for DCI of two different lengths. For example, a DCI of length 27 bits or 33 bits may be used to map to a PDCCH of AL-1.

The PDCCH decoding may be viewed as consisting of two parts, referred herein as RE Processing and Forward Error Correction (FEC) decoding. The RE Processing may include channel estimation, equalization, demodulation and soft channel bits (also known as Log Likelihood Ratios—LLRs) generation for each RE to be processed for a given PDCCH candidate. The FEC decoding may involve error correction of the received soft channel bits and CRC checking.

For a given PDCCH candidate, with example DCI lengths of 27 and 33, the RE Processing may be only performed once. However, the FEC decoding may be performed twice; once for DCI length of 27 and again for DCI length of 33. A similar process may be repeated for all the PDCCH candidates at each AL. This leads to a total of 22 PDCCH candidates between CSS and UESSS and with two FEC decoding per PDCCH candidate which leads to a total of 44 blind decoding attempts.

SUMMARY

A method and apparatus are disclosed that enable a UE to reduce the total number of decoding attempts without missing any PDCCH candidates that may be addressed to the UE which in turn may reduce the power consumption and may reduce the probability of false DCI detection.

In accordance with an aspect of the present disclosure, a method may decode a signal received at a client device in a wireless communication system, wherein the signal is arranged as a radio frame including a plurality of subframes and each of the subframes includes a plurality of Resource Elements (RE). The method may include controlling, by a processing device, for each Resource Element Group (REG) of each Control Channel Element (CCE) of a given subframe of the subframes, in which each REG includes a given plurality of REs and each CCE includes a given plurality of REGs, determining whether a valid signal is present in a given REG, based on a comparison of a first energy level of at least one Reference Symbol (RS) RE nearest to the given REG with a second energy level of non-RS REs in the given REG, and storing, in a memory, whether a given CCE of the given subframe is valid, based on whether at least a predetermined number of REGs of the given CCE is determined not to include a valid signal.

In one alternative, the given CCE may be indicated as invalid in the memory when at least the predetermined number of REGs of the given CCE is determined not to include a valid signal.

In one alternative, a valid signal may be determined to be present in the given REG based on an average of energy levels respectively of the non RS REs in the given REG as the second energy level.

In one alternative, a valid signal may be determined to be present in the given REG using a first predetermined threshold in the comparison of the first energy level with the second energy level.

In one alternative, the first energy level may be determined using at least one other RS RE adjacent to the at least one RS RE nearest to the given REG, in which the at least one other adjacent RS RE is external to the given REG.

In one alternative, the given subframe may include a plurality of Aggregation Levels (AL), each of the ALs includes a plurality of Physical Downlink Control Channel (PDCCH) candidates and each of the PDCCH candidates includes a given plurality of the CCEs, and the method may further include controlling, by the processing device, for a given AL of the given subframe, PDCCH decoding of a selected PDCCH candidate among PDCCH candidates forming the given AL, wherein the selected PDCCH candidate is determined according to an average energy of all CCEs forming a given PDCCH candidate of the given Al.

In one alternative, the method may further include controlling, by the processing device, ranking CCEs forming the given PDCCH candidate, and ranking REGs respectively forming the CCEs forming the given PDCCH, according to a level of energy of non-RS REs respectively of given REGs relative to a level of energy of at least one RS RE respectively near to the given REGs.

In one alternative, the ranking of a given CCE forming the given PDCCH candidate may be based on an energy level of all REGs of the given CCE as a percentage of a level of energy of given RS REs respectively near to the REGs of the given CCE.

In one alternative, an average energy level of all REGs of a given CCE forming the given PDCCH candidate may be an energy level of the given CCE.

In one alternative, among the PDCCH candidates forming the given AL, the PDCCH decoding may start at the selected PDCCH candidate, wherein the selected PDCCH candidate is determined to have a highest combined energy level for a given set of CCEs forming a given PDCCH candidate among the PDCCH candidates forming the given AL.

In one alternative, the given subframe may include a plurality of Aggregation Levels (AL), each of the ALs may include a plurality of Physical Downlink Control Channel (PDCCH) candidates and each of the PDCCH candidates may include a given plurality of the CCEs, and the method may further include controlling, by the processing device, PDCCH decoding of PDCCH candidates forming a given AL, based on a determination that the given AL was used by a base station during previous successful PDCCH reception by the client device from the base station.

In one alternative, the PDCCH decoding may be continued to be performed for the ALs of the given subframe, based on a determination whether a predetermined number of Downlink Control Information (DCI) items have been decoded for the given subframe.

In one alternative, the PDCCH decoding may be continued to be performed for the ALs of the given subframe, based on a determination whether a first number of Downlink allocation related DCI items and a second number of Uplink allocation related DCI items have been decoded for the given subframe, wherein the predetermined number is equal to a sum of the first number and the second number.

In one alternative, the method may include controlling, by the processing device, storing in the memory an indication of an AL of the ALs of the given subframe on which PDCCH decoding for the given subframe is performed last, when the determination is the predetermined number of DCI items have been decoded for the given subframe.

In accordance with an aspect of the present disclosure, an apparatus may decode a signal received at a client device in a wireless communication system, wherein the signal is arranged as a radio frame including a plurality of subframes and each of the subframes includes a plurality of Resource Elements (RE). The apparatus may include circuitry configured to control, for each Resource Element Group (REG) of each Control Channel Element (CCE) of a given subframe of the subframes, in which each REG includes a given plurality of REs and each CCE includes a given plurality of REGs, determining whether a valid signal is present in a given REG, based on a comparison of a first energy level of at least one Reference Symbol (RS) RE nearest to the given REG with a second energy level of non-RS REs in the given REG, and storing, in a memory, whether a given CCE of the given subframe is valid, based on whether at least a predetermined number of REGs of the given CCE is determined not to include a valid signal.

In one alternative of the apparatus, the given CCE may be indicated as invalid in the memory when at least the predetermined number of REGs of the given CCE is determined not to include a valid signal.

In one alternative of the apparatus, a valid signal may be determined to be present in the given REG based on an average of energy levels respectively of the non RS REs in the given REG as the second energy level.

In one alternative of the apparatus, the given subframe may include a plurality of Aggregation Levels (AL), each of the ALs may include a plurality of Physical Downlink Control Channel (PDCCH) candidates and each of the PDCCH candidates may include a given plurality of the CCEs, and the circuitry may be configured to control, for a given AL of the given subframe, PDCCH decoding of a selected PDCCH candidate among PDCCH candidates forming the given AL, wherein the selected PDCCH candidate is determined according to an average energy of all CCEs forming a given PDCCH candidate of the given Al.

In one alternative of the apparatus, the given subframe may include a plurality of Aggregation Levels (AL), each of the ALs may include a plurality of Physical Downlink Control Channel (PDCCH) candidates and each of the PDCCH candidates may include a given plurality of the CCEs, and the circuitry may be configured to control PDCCH decoding of PDCCH candidates forming a given AL, based on a determination that the given AL was used by a base station during previous successful PDCCH reception by the client device from the base station.

In accordance with an aspect of the present disclosure, a wireless communication may include a receiver to receive a signal of a wireless communication system; and a processing device configured to control decoding the signal, wherein the signal is arranged as a radio frame including a plurality of subframes and each of the subframes includes a plurality of Resource Elements (RE), wherein the processing device is configured to control: for each Resource Element Group (REG) of each Control Channel Element (CCE) of a given subframe of the subframes, in which each REG includes a given plurality of REs and each CCE includes a given plurality of REGs, determining whether a valid signal is present in a given REG, based on a comparison of a first energy level of at least one Reference Symbol (RS) RE nearest to the given REG with a second energy level of non-RS REs in the given REG, and storing, in a memory, whether a given CCE of the given subframe is valid, based on whether at least a predetermined number of REGs of the given CCE is determined not to include a valid signal.

BRIEF DESCRIPTION OF THE DRAWINGS

FIG. 11 illustrates mapping of CCEs to PDCCH candidates of different ALs for Common Search Space.

DETAILED DESCRIPTION

Figure 1:
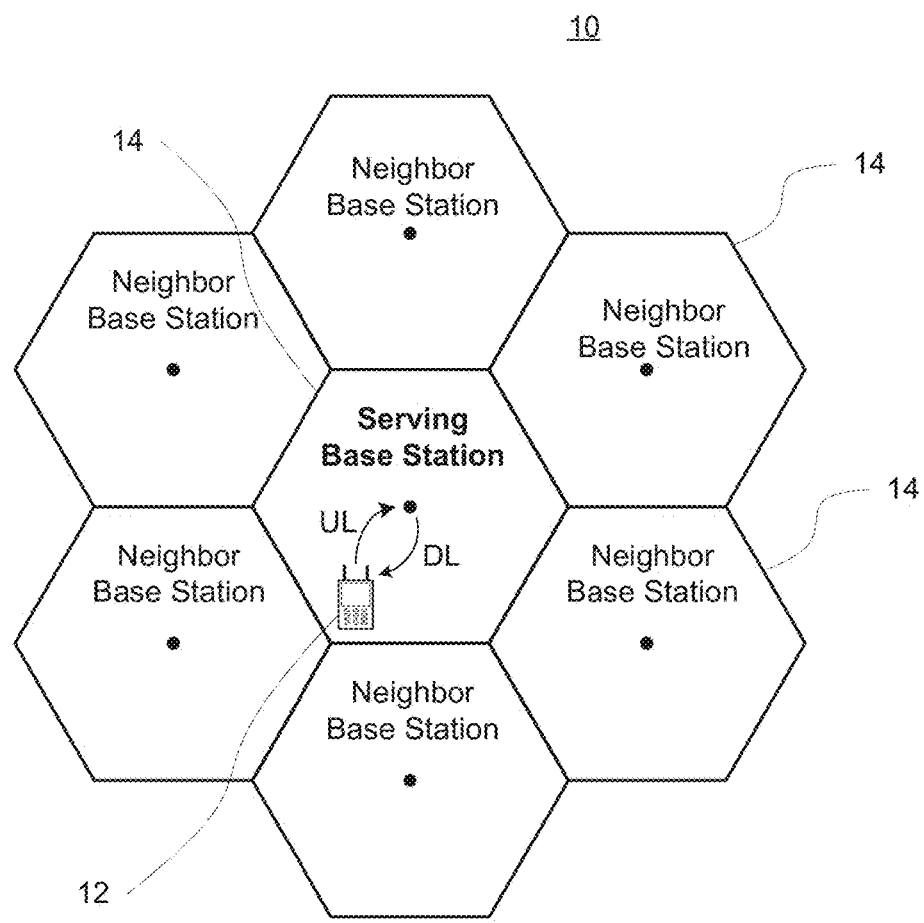
FIG. 1 illustrates a conventional wireless cellular communication system.
Figure 2:
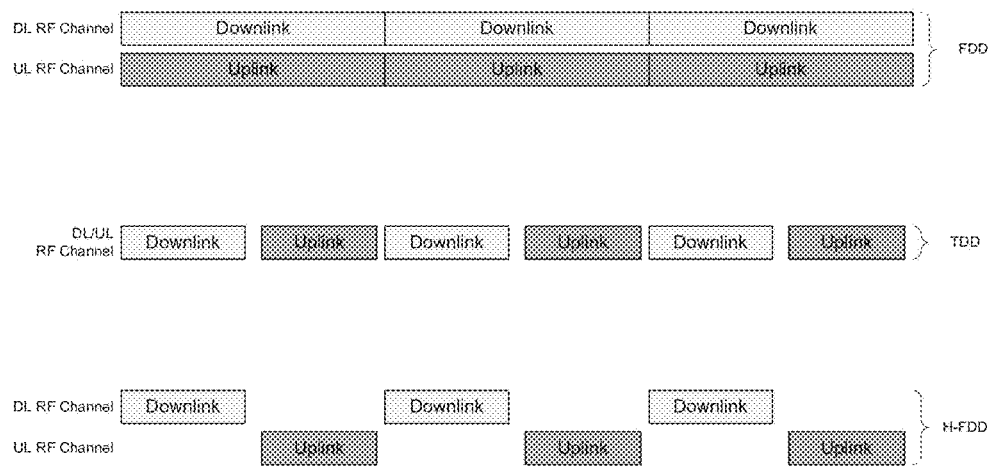
FIG. 2 illustrates FDD, TDD and H-FDD duplexing techniques.
Figure 3:
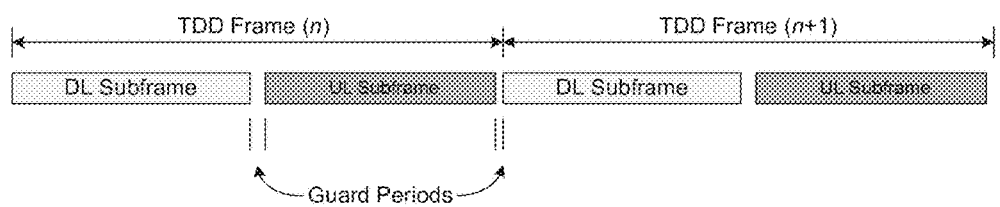
FIG. 3 illustrates a TDD frame consisting of DL portions and UL portions.
Figure 4:
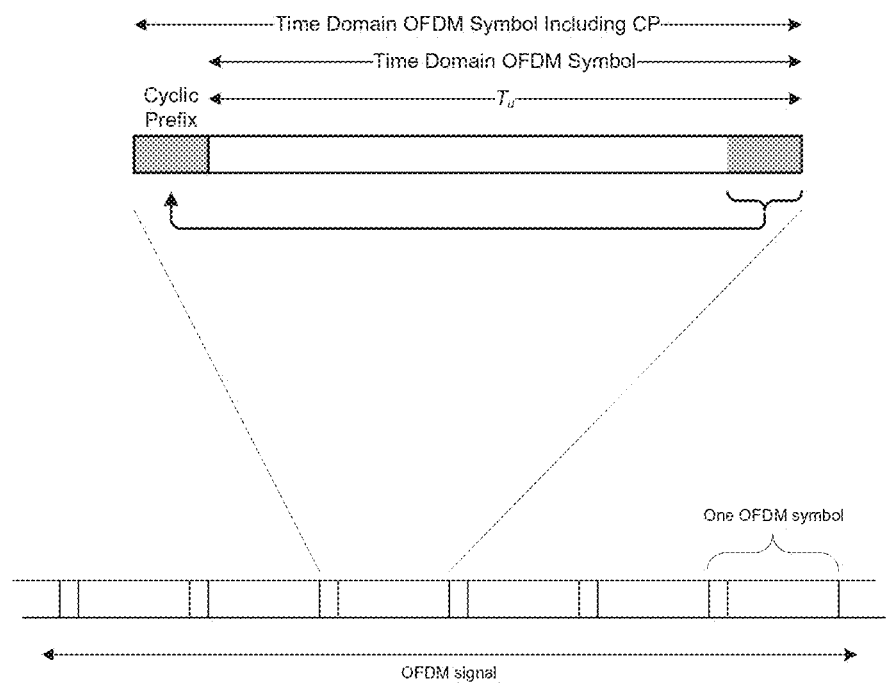
FIG. 4 illustrates an OFDM symbol with Cyclic Prefix Insertion.
Figure 5:
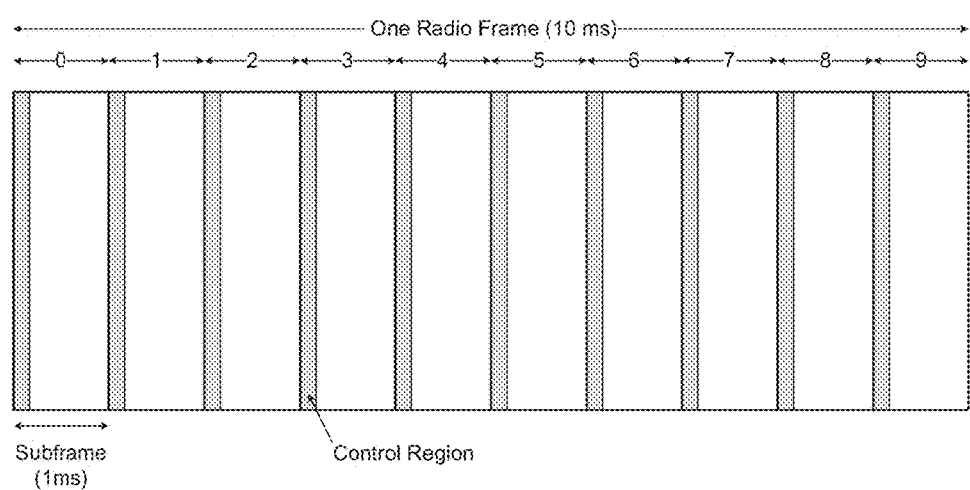
FIG. 5 illustrates the frame structure of the air interface of the 3GPP LTE wireless communication system.
Figure 6:
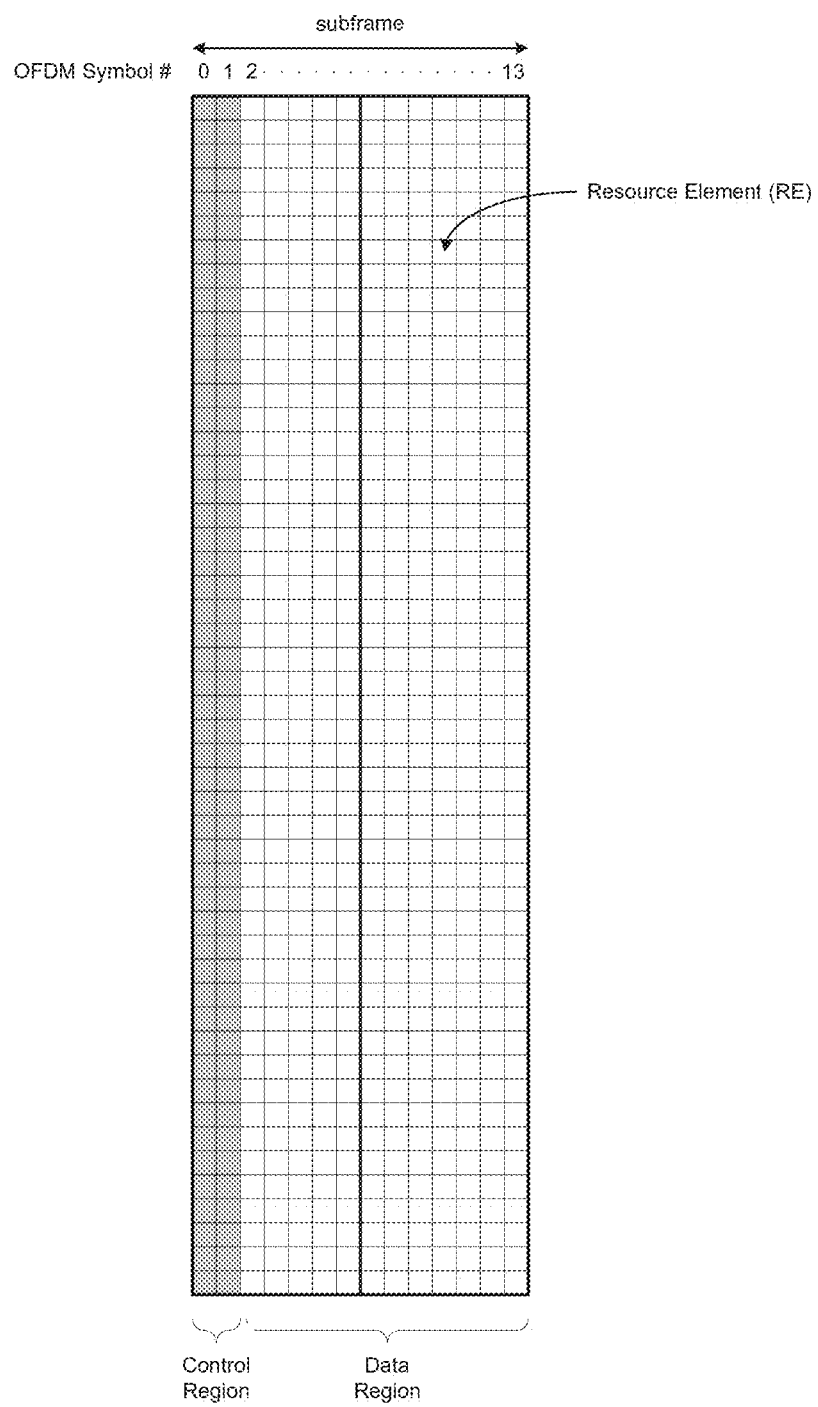
FIG. 6 illustrates an example Resource Element (RE) and the locations of control region, and data region in a subframe of 3GPP LTE wireless communication system.
Figure 7:
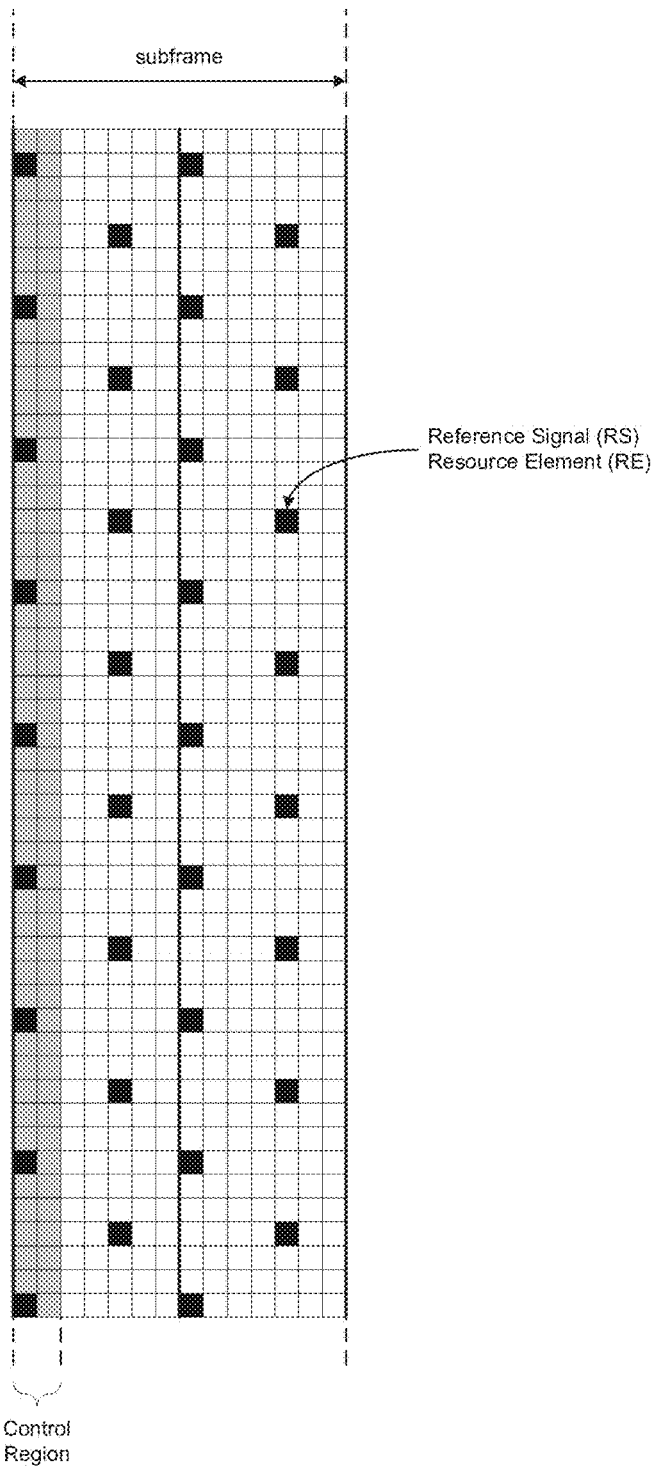
FIG. 7 illustrates an example of locations of Reference Signal (RS) REs in a subframe of 3GPP LTE wireless communication system.
Figure 8:
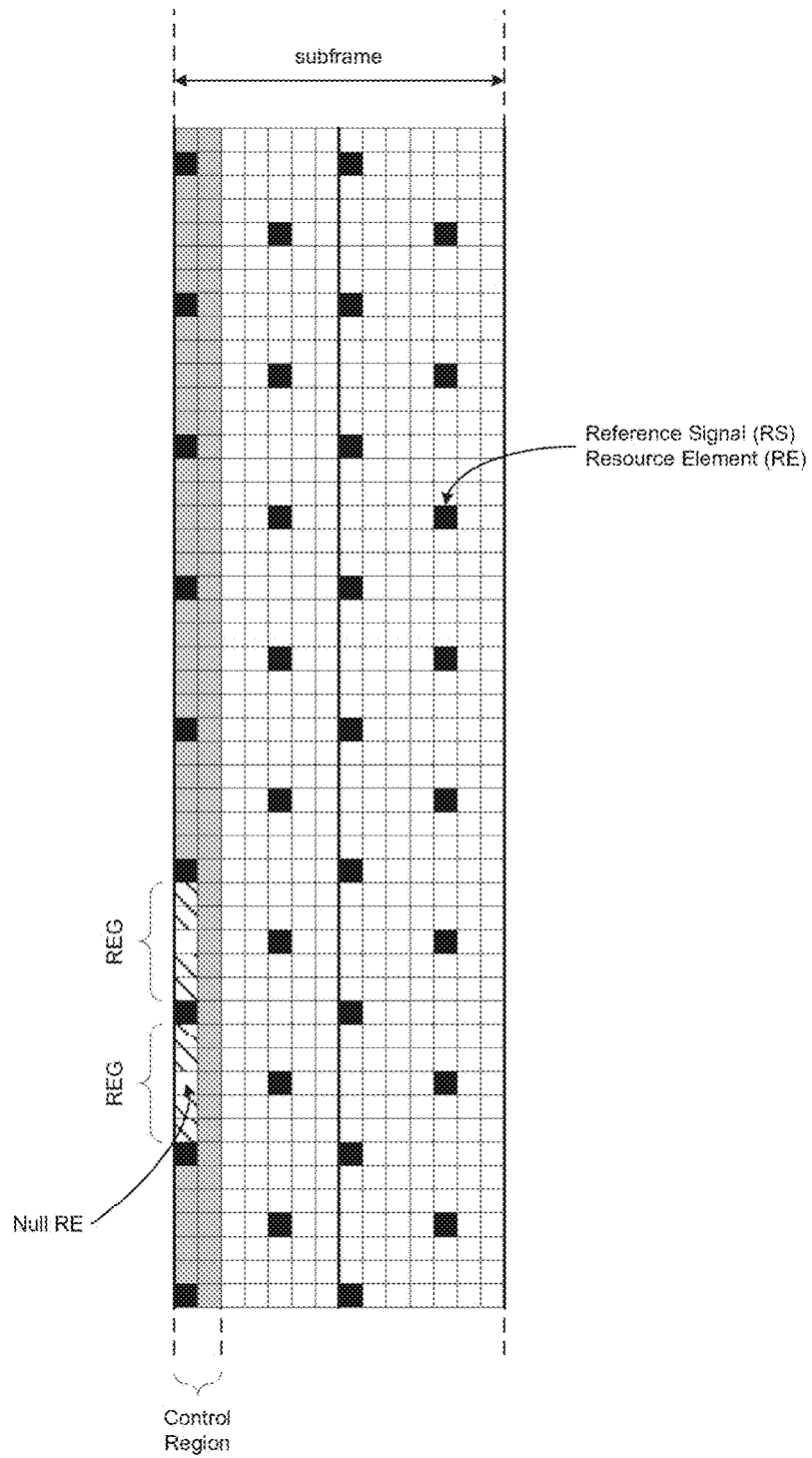
FIG. 8 illustrates an example of the Reference Element Groups (REGs) in control region of a subframe of 3GPP LTE wireless communication system.
Figure 9:
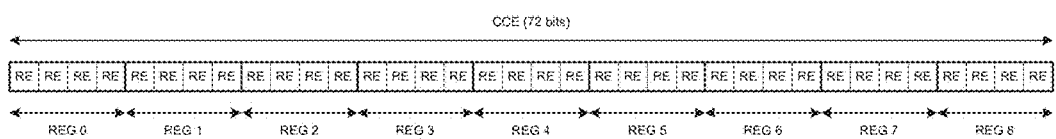
FIG. 9 illustrates the structure of a Control Channel Element (CCE) in units of REGs.
Figure 10:
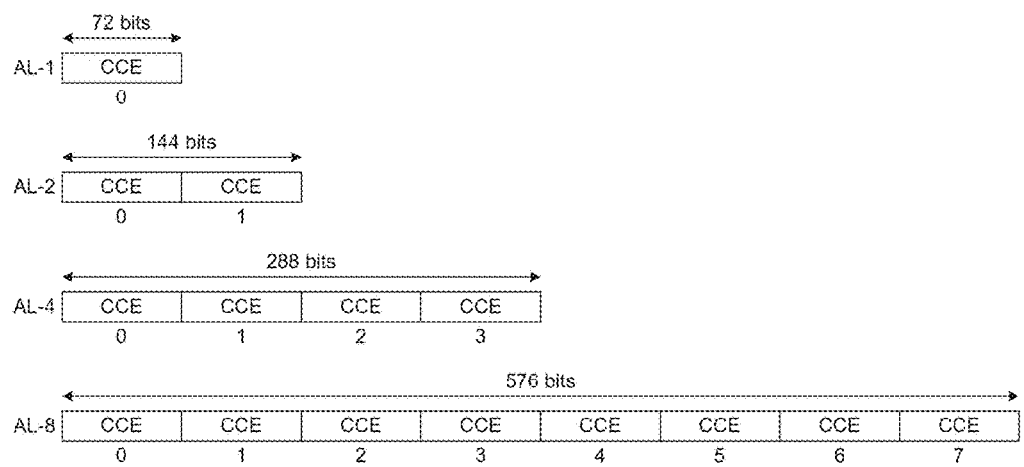
FIG. 10 illustrates different Aggregation Levels (ALs) of a PDCCH.
Figure 12:
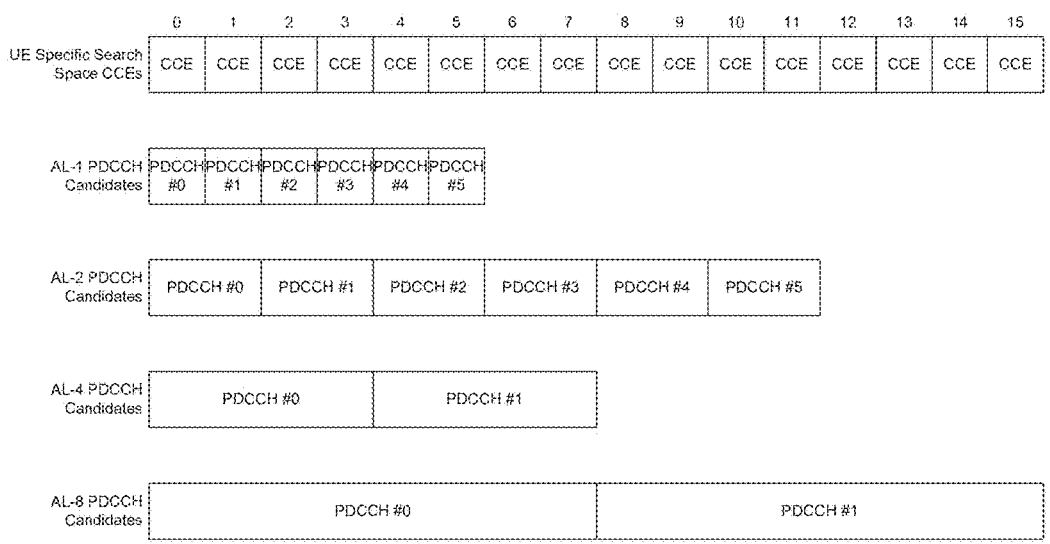
FIG. 12 illustrates an example mapping of CCEs to PDCCH candidates of different ALs for UE Specific Search Space.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

To enable reliable channel estimation, an eNB may always transmit the RS regardless of whether any other data is being transmitted or not in any subframe. To reduce the interference to other cells, the eNB may only transmit control information on the REGs and CCEs in a control region where it needs to send a PDCCH. This may lead to scenarios where a portion of the control region may be unused by the eNB.

According to an aspect of the present disclosure, a UE may be able to detect the unused portion of control region and avoid making any PDCCH decoding attempts for candidates that fall on the unused portions of the control region of a subframe.

Figure 13:
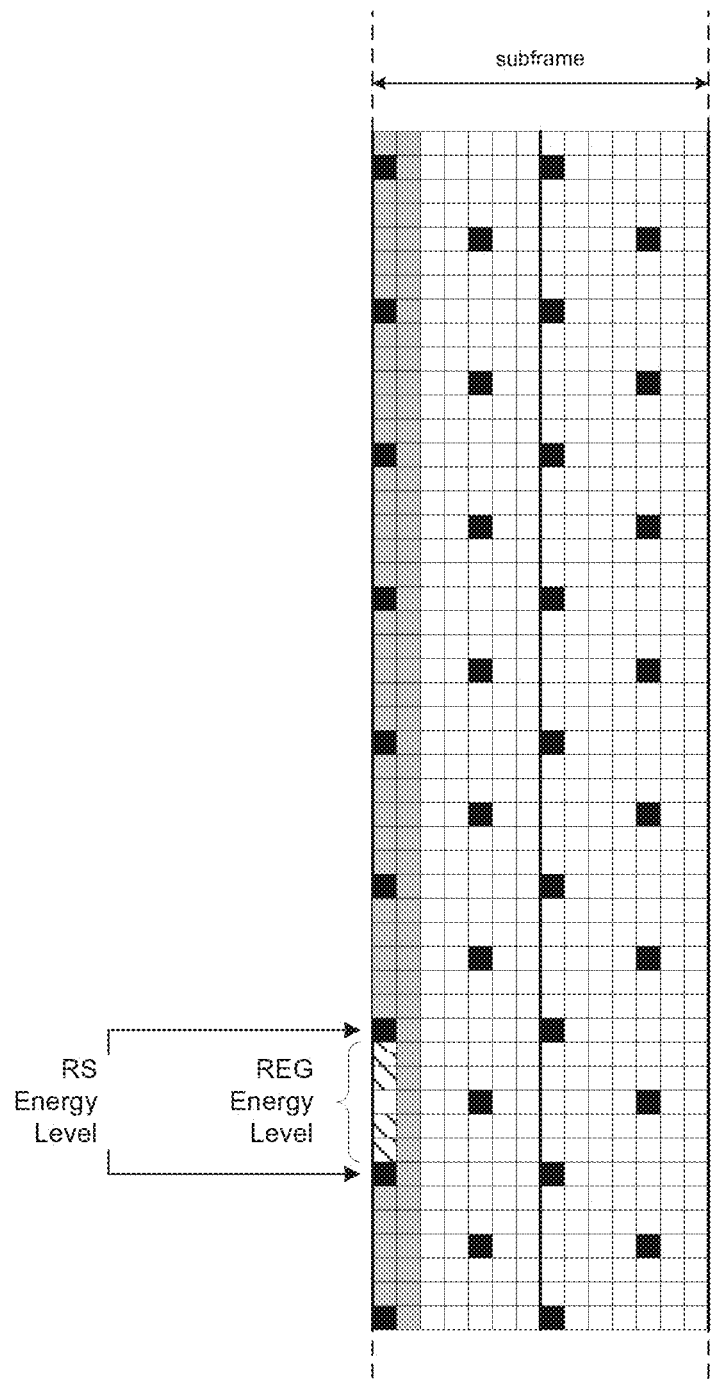
FIG. 13 illustrates an example of the REs used for estimating REG energy and the associated RS REs used for estimating RS RE energy according to the aspects of the present disclosure.

According to an aspect of the present disclosure, a determination may be made about whether there is any valid signal present in any given REG. The determination of whether there is any valid signal present in any given REG may be based on the energy level of the non-RS REs belonging to an REG compared to the energy level of the one or two nearest RS REs for a given REG as illustrated in FIG. 13. Energy level of an RE may be computed by performing the multiplication of the complex value received in an RE with its complex conjugate. When computing energy over multiple REs, the energy of individual REs may be accumulated and then divided by the number of REs used in accumulation.

Figure 14:
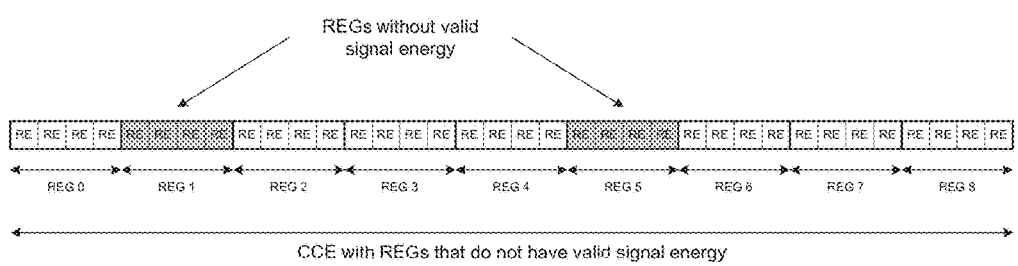
FIG. 14 illustrates an example CCE containing REGs that may not have valid signal energy according to the aspects of the present disclosure.
Figure 15:
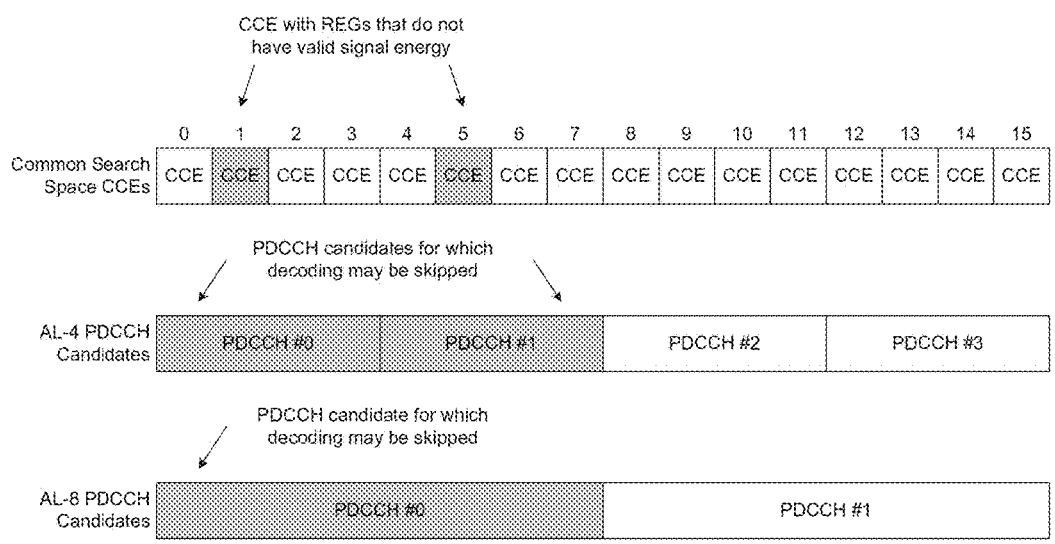
FIG. 15 illustrates example PDCCHs containing CCEs that may have REGs that may not have valid signal energy according to the aspects of the present disclosure.

According to another aspect of the present disclosure, a valid signal presence may be determined for all the REGs that belong to a given CCE. According to another aspect of the present disclosure, if a configurable number of REGs belonging to the same CCE do not have a valid signal present in them, then the entire CCE may be considered to have no useful signal in it for a particular UE. An example of such a scenario is illustrated in FIG. 14. According to another aspect of the present disclosure, if it is determined that a CCE does not have a valid signal present, then any PDCCH candidate formed using that CCE may be skipped and may not be considered for further decoding. An example of such a scenario is shown in FIG. 15. According to another aspect of the present disclosure, the metrics to determine whether an REG contains a valid signal may be based on the energy of the actual REs that form the REG relative to the energy in the nearest RS. For example, if the average energy of the REs of an REG is below the average energy of the nearest one or two RS REs by a configurable amount, then the REG may be considered to not have a valid signal present in it. If the average energy of the REs of an REG is equal or above the average energy of the nearest one or two RS REs by a configurable amount, then the REG may be considered to have a valid signal present in it. The metrics to determine whether an REG has a valid signal present in it may be based on the average of the energy of the actual REs that form the REG and the energy of the one or more nearest RS REs. The various thresholds used for making the determination of valid REG and valid CCE may be configurable.

Figure 16:
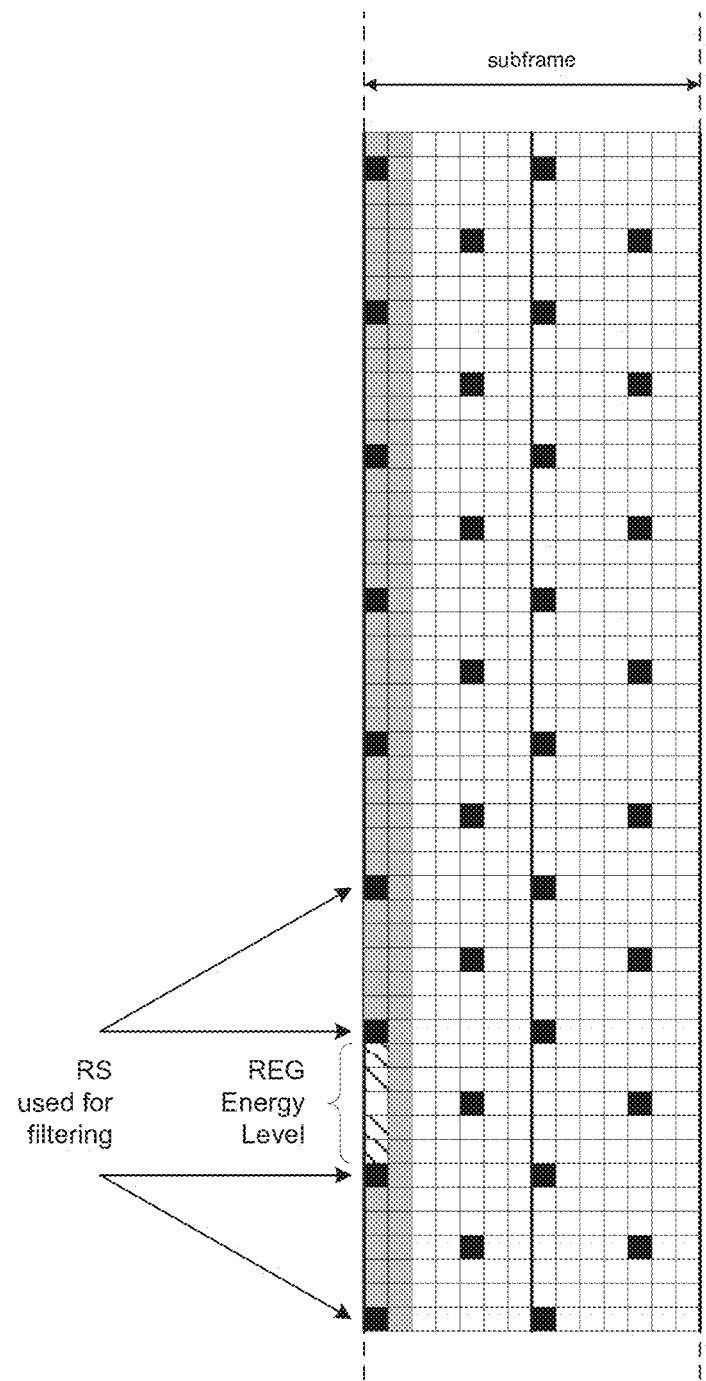
FIG. 16 illustrates an example of a set of RS REs that may be used for filtering the signal in individual RS REs according to the aspects of the present disclosure.

According to another aspect of the present disclosure, the RS REs may be filtered using one of the conventional channel estimation techniques to reduce the impact of noise and interference on a single RS RE which in turn may affect the accuracy of the energy in RS REs which in turn may affect the REG and CCE validity detection logic. The filtering of a particular RS RE may use other RS that are in the vicinity of the RS RE that is closest to the REG under consideration as illustrated in FIG. 16.

According to another aspect of the present disclosure, the PDCCH decoding order may be based on the average energy of all the CCEs that make up a PDCCH. The REGs and CCEs may be ranked according to the level of the energy in the REs relative to the RS. According to another aspect of the present disclosure, the energy of all the REGs may be expressed as a percentage of the RS RE energy. According to another aspect of the present disclosure, the average energy of all the REGs belonging to a CCE may give the CCE energy. The PDCCH decoder then may start the blind decoding based on the strongest combined energy level for the set of CCEs that form a PDCCH candidate within a given Aggregation Level.

The selection of the AL by an eNB to transmit a PDCCH to a particular UE may be based on the ability of a UE to successfully receive the PDCCH. Therefore, for the UEs that are farther away from an eNB or in poor signal conditions area, an eNB may use higher AL to get the advantage of higher coding gain to ensure that the PDCCH is successfully decoded by the UEs in their prevailing signal conditions. Similarly, when a UE is near an eNB or in good signal conditions, the eNB may use a lower AL which may be sufficient to enable the UEs to decode the PDCCH. According to an aspect of the present disclosure, a UE may first attempt to decode the PDCCH candidates for the AL that was used by the eNB during previous successful PDCCH reception by UE. While it is possible that the AL used by the eNB may vary from subframe to subframe, it is more likely to use the same AL, based on prevailing signal and channel conditions for a reasonably long enough period of time which may enable reduced blind decoding attempts to find the first successful PDCCH decoding by a UE. According to another aspect of the present invention, the UE may determine and limit the maximum number of DCIs expected in any given subframe. The limit may be set separately for Downlink allocation related DCIs and Uplink allocation related DCIs. Once the specified number of DCIs has been decoded, the blind PDCCH decoding may be stopped before exhausting all 44 blind decoding attempts. Attempting PDCCH decode first for AL that was used for previous successful PDCCH may help stop the blind PDCCH decoding early in the overall blind decoding process. This may reduce power consumption and may reduce the probability of false DCI detection. According to another aspect of the disclosure, the UE may maintain a separate memory for the AL of the last successful PDCCH for Downlink DCI and uplink DCI.

Identification of invalid REGs and CCEs and starting the PDCCH decoding with AL that was last used for successful PDCCH decoding may significantly reduce the number of blind decoding attempts and may reduce power consumption and may reduce the probability of false DCI detection.

Figure 17:
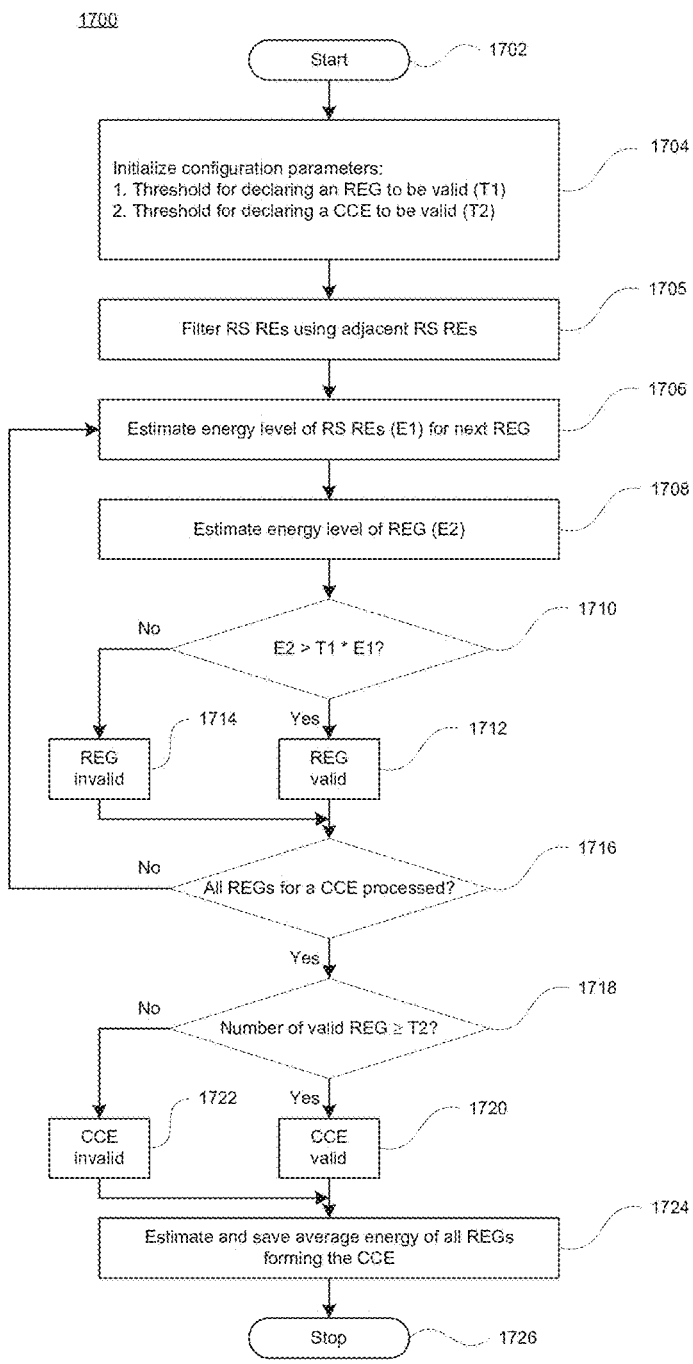
FIG. 17 illustrates an exemplary flow chart for the processing steps for determining valid REGs and valid CCEs in accordance with the aspects of the present disclosure.

By way of example only, the flow diagram 1700 contained in FIG. 17 illustrates processing steps for determining valid REGs and valid CCEs according to various aspects of the present disclosure. At processing stage 1704, the following parameters may be initialized: the threshold T1 for declaring an REG to be valid and the threshold T2 for declaring a CCE to be valid. The value of T1 may be, for example, 0.75 and the value of T2 may be, for example 5. At processing stage 1705, the RS REs are filtered using adjacent RS REs to reduce the impact of noise and interference on a single RS RE. At processing stage 1706, average energy level E1 of RS REs nearest to the REG is estimated. At processing stage 1708, average energy level E2 of the REG is estimated. At processing stage 1710, average energy level E1 is multiplied with threshold T1 and compared with average energy E2. If E2>T1*E1, the processing continues at processing stage 1712 where the REG is declared to be valid. If E2 T1*E1, the processing continues at processing stage 1714 where the REG is declared to be invalid. At processing stage 1716, determination is made whether all the REGs belonging to a CCE are processed. If not all the REGs belonging to a CCE are processed, the processing returns to processing stage 1706. If all the REGs belonging to a CCE are processed, the processing continues to processing stage 1718. At processing stage 1718, the number of valid REGs is compared with T2, the minimum number of expected valid REGs for a CCE to be considered valid. If the number of valid REGs in current CCE is greater than or equal to T2, the processing continues to processing stage 1720 where the CCE is declared to be valid. If the number of valid REGs in current CCE is less than T2, the processing continues to processing stage 1722 where the CCE is declared to be invalid. At processing stage 1724, the average energy of all REGs forming the CCE is computed and saved. At processing stage 1726, the processing for determining valid REGs and valid CCE may suitably terminate. The same processing may be applied for all the CCEs to be used for PDCCH blind decoding.

Figure 18:
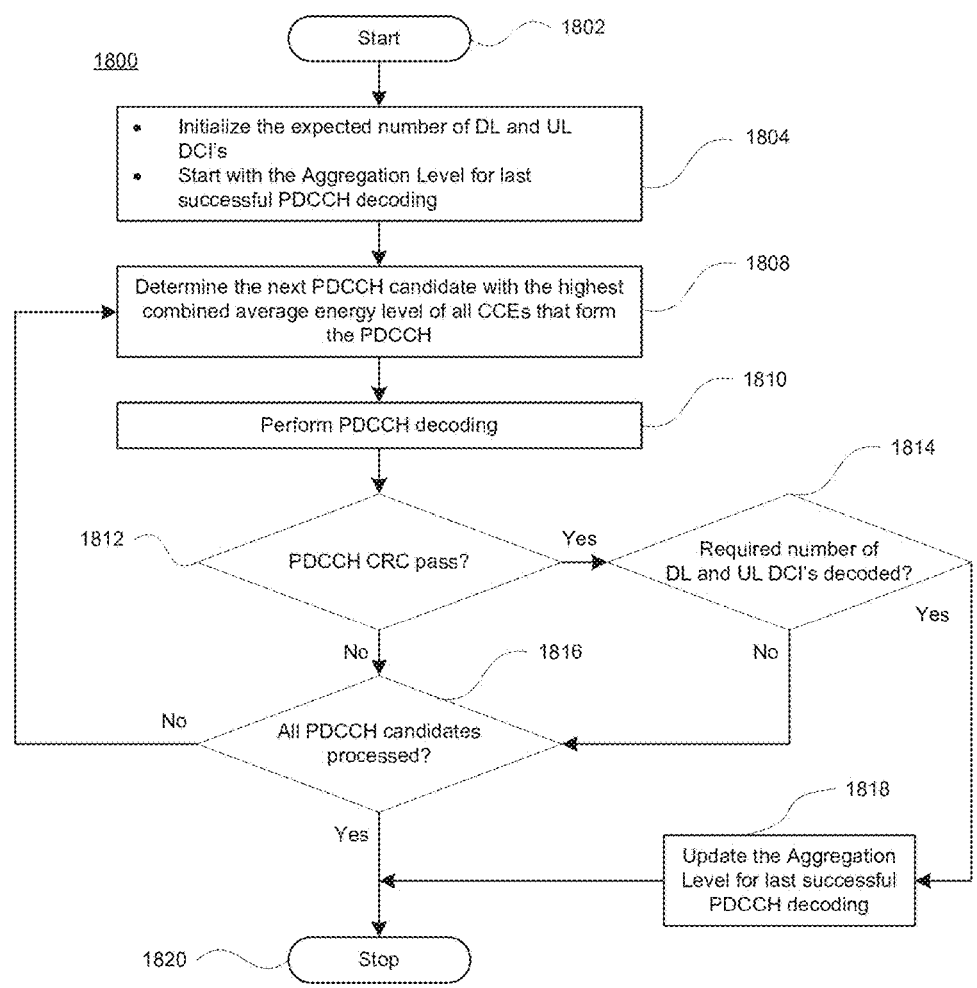
FIG. 18 illustrates an exemplary flow chart for the processing steps for PDCCH decoding in accordance with the aspects of the present disclosure.

By way of example only, the flow diagram 1800 contained in FIG. 18 illustrates processing steps for PDCCH decoding. At processing stage 1804, the expected number of DL and UL DCI's are initialized and the Aggregation Level to be used for starting the PDCCH decoding is set according to the last successful PDCCH from previous blind decoding attempts. If this is the first time the PDCCH blind decoding is attempted, the Aggregation Level to be used for starting the PDCCH decoding may be initialized to 8. At processing stage 1808, the next PDCCH candidate with the highest combined average energy level of all CCEs that form the PDCCH is determined. At processing stage 1810, PDCCH decoding is performed using the selected PDCCH candidate. At processing stage 1812, the PDCCH CRC is checked. If the CRC passes, the processing continues to processing stage 1814, where determination is made whether the required number of DL and UL DCI's are decoded. If the required number of DL and UL DCI's are not yet decoded, the processing continues to processing stage 1816. If the required number of DL and UL DCI's are decoded, the processing continues to processing stage 1818 where the Aggregation Level of the last successful PDCCH is saved for use during the next PDCCH blind decoding process and the PDCCH blind decoding process may suitably terminate early at processing stage 1820. Returning to the processing stage 1812, if the CRC fails, the processing continues to processing stage 1816 where determination is made whether all PDCCH candidates are processed. If not all PDCCH candidates are processed, the processing returns to processing stage 1808. If all PDCCH candidates are processed, the processing continues to processing stage 1820 where the PDCCH blind decoding process may suitably terminate. By way of example only, the above-described method may be implemented in a receiver, e.g., a user device such as a wireless mobile station (MS) 12 as shown in FIG. 1.

Figure 19:
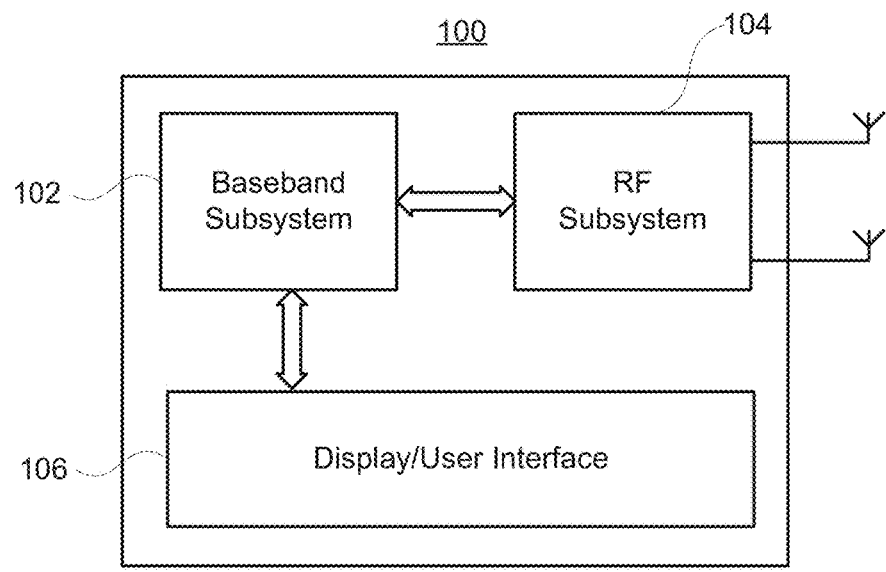
FIG. 19 illustrates a wireless mobile station diagram, which may be employed with aspects of the invention described herein.

As shown in FIG. 19, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 20:
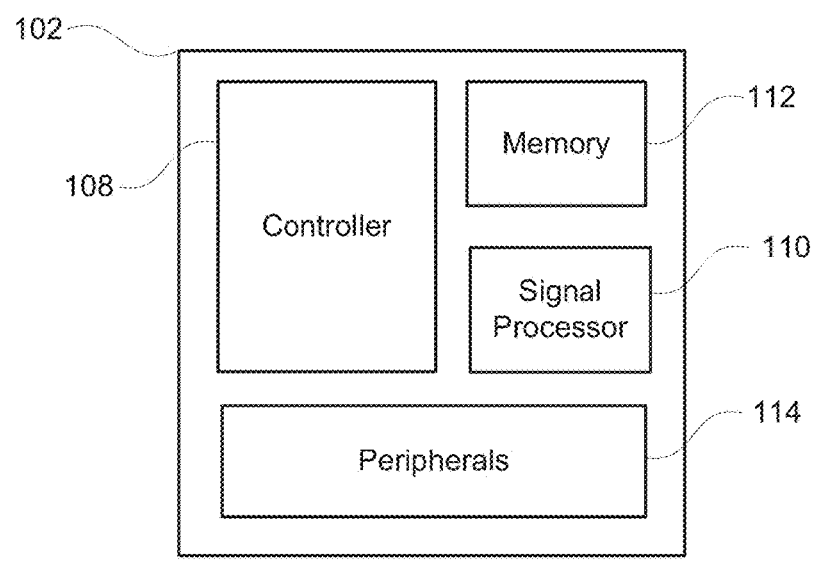
FIG. 20 illustrates an application processor subsystem for a wireless mobile station, which may be employed with aspects of the invention described herein.
Figure 21:
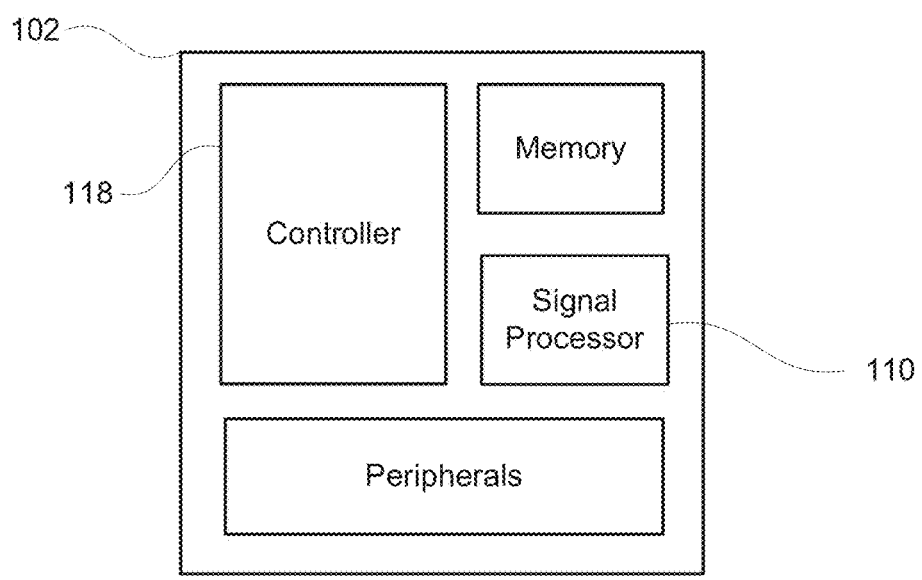
FIG. 21 illustrates a baseband subsystem for a wireless mobile station, which may be employed with aspects of the invention described herein.
Figure 22:
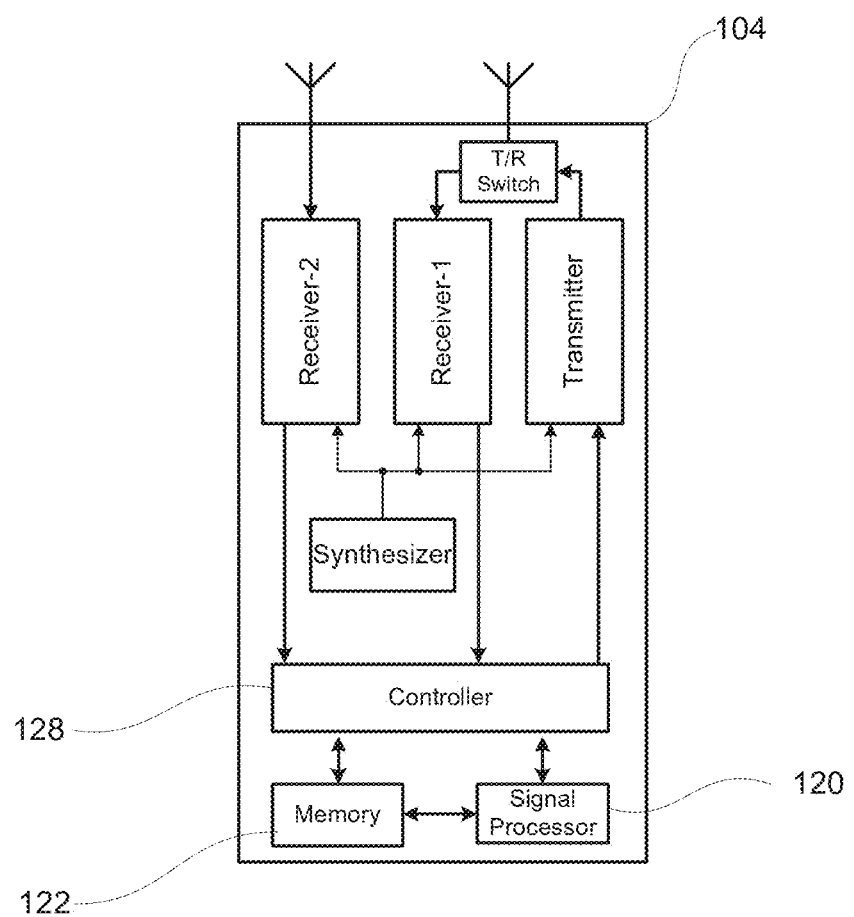
FIG. 22 illustrates a Radio Frequency (RF) subsystem for a wireless mobile station, which may be employed with aspects of the invention described herein.

The application processor subsystem 101 as shown in FIG. 20 may include a controller 108 such as a microcontroller, another processor or other circuitry. The baseband subsystem 102 as shown in FIG. 21 may include a controller 118 such as a microcontroller or other processor. The RF subsystem 104 as shown in FIG. 22 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 21 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for decoding a signal received at a client device in a wireless communication system, wherein the signal is arranged as a radio frame including a plurality of subframes, each of the subframes includes a plurality of Aggregation Levels (AL), each of the ALs includes a plurality of Physical Downlink Control Channel (PDCCH) candidates, each of the PDCCH candidates includes a plurality of Control Channel Elements (CCEs), each of the CCEs includes a plurality of Resource Element Groups (REGs) and each of the REGs includes a plurality of Resource Elements (RE), the method comprising:

controlling, by a processing device, for each REG of each CCE of a given subframe of the subframes, determining whether a valid signal energy level for REG is present in a given REG, based on a comparison of a first energy level of at least one Reference Symbol (RS) RE nearest to the given REG with a second energy level of non-RS REs in the given REG, storing, in a memory, whether a given CCE of the given subframe is valid for PDCCH decoding processing, based on whether at least a predetermined number of REGs of the given CCE is determined not to have a valid signal energy level for CCE; and determining a PDCCH decoding order among PDCCH candidates forming a given AL of the given subframe, based on ranking CCEs forming a given PDCCH candidate of the given AL, and ranking REGs respectively forming the CCEs forming the given PDCCH candidate, wherein the ranking the CCEs forming the given PDCCH candidate, and the ranking the REGs respectively forming the CCEs forming the given PDCCH are according to a level of energy of non-RS REs respectively of given REGs relative to a level of energy of at least one RS RE respectively near to the given REGs.

2. The method of claim 1, wherein the given CCE is indicated as invalid in the memory when at least the predetermined number of REGs of the given CCE is determined not to have the valid signal energy level for REG.

3. The method of claim 1, wherein the valid signal energy level for REG is determined to be present in the given REG based on an average of energy levels respectively of the non RS REs in the given REG as the second energy level.

4. The method of claim 1, wherein the valid signal energy level for REG is determined to be present in the given REG using a first predetermined threshold in the comparison of the first energy level with the second energy level.

5. The method of claim 1,
wherein the first energy level is determined using at least one other RS RE adjacent to the at least one RS RE nearest to the given REG, in which the at least one other adjacent RS RE is external to the given REG.

6. The method of claim 1, further comprising:
controlling, by the processing device, determining the PDCCH decoding order for the given AL, according to an average energy of all CCEs forming a given PDCCH candidate of the given AI.

7. The method of claim 1, wherein the ranking of a given CCE forming the given PDCCH candidate is based on an energy level of all REGs of the given CCE as a percentage of a level of energy of given RS REs respectively near to the REGs of the given CCE.

8. The method of claim 1, wherein an average energy level of all REGs of a given CCE forming the given PDCCH candidate is an energy level of the given CCE.

9. The method of claim 6, further comprising:
controlling, by the processing device, PDCCH decoding for the given AL to start at a selected PDCCH candidate determined to have a highest combined energy level for a given set of CCEs forming a given PDCCH candidate among the PDCCH candidates forming the given AL.

10. The method of claim 1, further comprising:
controlling, by the processing device, PDCCH decoding for the given AL, based on a determination that the given AL was used by a base station during previous successful PDCCH reception by the client device from the base station.

11. The method of claim 6, further comprising:
controlling, by the processing device, PDCCH decoding for the ALs of the given subframe, based on a determination whether a predetermined number of Downlink Control Information (DCI) items have been decoded for the given subframe.

12. The method of claim 11, wherein the PDCCH decoding is continued to be performed for the ALs of the given subframe, based on a determination whether a first number of Downlink allocation related DCI items and a second number of Uplink allocation related DCI items have been decoded for the given subframe, wherein the predetermined number is equal to a sum of the first number and the second number.

13. The method of claim 11, further comprising:
controlling, by the processing device, storing in the memory an indication of an AL of the ALs of the given subframe on which PDCCH decoding for the given subframe is performed last, when the determination is the predetermined number of DCI items have been decoded for the given subframe.

14. An apparatus for decoding a signal received at a client device in a wireless communication system, wherein the signal is arranged as a radio frame including a plurality of subframes, each of the subframes includes a plurality of Aggregation Levels (AL), each of the ALs includes a plurality of Physical Downlink Control Channel (PDCCH) candidates, each of the PDCCH candidates includes a plurality of Control Channel Elements (CCEs), each of the CCEs includes a plurality of Resource Element Groups (REGs) and each of the REGs includes a plurality of Resource Elements (RE), the apparatus comprising:
circuitry configured to control, for each REG of each CCE of a given subframe of the subframes, determining whether a valid signal energy level for REG is present in a given REG, based on a comparison of a first energy level of at least one Reference Symbol (RS) RE nearest to the given REG with a second energy level of non-RS REs in the given REG,
storing, in a memory, whether a given CCE of the given subframe is valid for PDCCH decoding processing, based on whether at least a predetermined number of REGs of the given CCE is determined not to have a valid signal energy level for CCE; and
determining a PDCCH decoding order among PDCCH candidates forming a given AL of the given subframe, based on ranking CCEs forming a given PDCCH candidate of the given AL, and ranking REGs respectively forming the CCEs forming the given PDCCH candidate, wherein the ranking the CCEs forming the given PDCCH candidate, and the ranking the REGs respectively forming the CCEs forming the given PDCCH are according to a level of energy of non-RS REs respectively of given REGs relative to a level of energy of at least one RS RE respectively near to the given REGs.

15. The apparatus of claim 14, wherein the given CCE is indicated as invalid in the memory when at least the predetermined number of REGs of the given CCE is determined not to have the valid signal energy level for REG.

16. The apparatus of claim 14, wherein the valid signal energy level for REG is determined to be present in the given REG based on an average of energy levels respectively of the non RS REs in the given REG as the second energy level.

17. The apparatus of claim 14,
wherein the circuitry is configured to control determining the PDCCH decoding order for the given AL, according to an average energy of all CCEs forming a given PDCCH candidate of the given AI.

18. The apparatus of claim 14,
wherein the circuitry is configured to control PDCCH decoding for the given AL, based on a determination that the given AL was used by a base station during previous successful PDCCH reception by the client device from the base station.

19. A wireless communication device comprising:
a receiver to receive a signal of a wireless communication system; and
a processing device configured to control decoding the signal, wherein the signal is arranged as a radio frame including a plurality of subframes, each of the subframes includes a plurality of Aggregation Levels (AL), each of the ALs includes a plurality of Physical Downlink Control Channel (PDCCH) candidates, each of the PDCCH candidates includes a plurality of Control Channel Elements (CCEs), each of the CCEs includes a plurality of Resource Element Groups (REGs) and each of the REGs includes a plurality of Resource Elements (RE),
wherein the processing device is configured to control:
for each REG of each CCE of a given subframe of the subframes, determining whether a valid signal energy level for REG is present in a given REG, based on a comparison of a first energy level of at least one Reference Symbol (RS) RE nearest to the given REG with a second energy level of non-RS REs in the given REG,
storing, in a memory, whether a given CCE of the given subframe is valid for PDCCH decoding processing, based on whether at least a predetermined number of REGs of the given CCE is determined not to have a valid signal energy level for CCE; and
determining a PDCCH decoding order among PDCCH candidates forming a given AL of the given subframe, based on ranking CCEs forming a given PDCCH candidate of the given AL, and ranking REGs respectively forming the CCEs forming the given PDCCH candidate, wherein the ranking the CCEs forming the given PDCCH candidate, and the ranking the REGs respectively forming the CCEs forming the given PDCCH are according to a level of energy of non-RS REs respectively of given REGs relative to a level of energy of at least one RS RE respectively near to the given REGs.

* * * * *